United States Patent [19]

Baumann

[11] Patent Number: 4,619,993
[45] Date of Patent: Oct. 28, 1986

[54] AZO COMPOUNDS HAVING A 2,4-DINITRO-5-THIOCYANOPHENYL DIAZO COMPONENT RADICAL

[75] Inventor: Werner Baumann, Therwil, Switzerland

[73] Assignee: Sandoz Ltd., Basel, Switzerland

[21] Appl. No.: 631,930

[22] Filed: Jul. 18, 1984

Related U.S. Application Data

[63] Continuation-in-part of Ser. No. 459,730, Jan. 20, 1983, abandoned.

[30] Foreign Application Priority Data

Jan. 23, 1982 [DE] Fed. Rep. of Germany ....... 3202117

[51] Int. Cl.$^4$ .................... C09B 29/01; C09B 29/085; C09B 29/36; C09B 29/44
[52] U.S. Cl. .................... 534/735; 534/588; 534/593; 534/643; 534/730; 534/731
[58] Field of Search .............. 534/735, 736, 731, 643; 260/152, 155, 157, 158, 163, 207, 207.1, 205, 206

[56] References Cited

U.S. PATENT DOCUMENTS

| 2,430,484 | 11/1947 | Strain et al. | 260/163 |
|---|---|---|---|
| 2,529,924 | 11/1950 | Dickey | 260/155 |
| 2,993,886 | 7/1961 | Weis et al. | 260/163 |
| 4,307,015 | 12/1981 | Koerte | 260/196 |

FOREIGN PATENT DOCUMENTS

| 2709774 | 9/1977 | Fed. Rep. of Germany | 260/196 |
|---|---|---|---|
| 303813 | 1/1929 | United Kingdom | 260/454 |
| 870580 | 6/1961 | United Kingdom | 260/158 |
| 1445438 | 8/1976 | United Kingdom | 260/207 |
| 1447540 | 8/1976 | United Kingdom | 260/207 |

Primary Examiner—Floyd D. Higel
Attorney, Agent, or Firm—Gerald D. Sharkin; Richard E. Vila; Melvyn M. Kassenoff

[57] ABSTRACT

Compounds of the formula

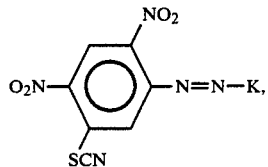

wherein K is a coupling component radical, are useful for dyeing textile materials comprising a synthetic or semisynthetic, hydrophobic, high molecular weight material, e.g., linear aromatic polyesters, cellulose 2½ acetate, cellulose triacetate and synthetic polyamides.

18 Claims, No Drawings

AZO COMPOUNDS HAVING A 2,4-DINITRO-5-THIOCYANOPHENYL DIAZO COMPONENT RADICAL

This application is a continuation-in-part of application Ser. No. 459,730, filed Jan. 20, 1983 and now abandoned.

The invention relates to rhodanphenylazo dyestuffs which, in particular, are useful for dyeing textile material.

The invention provides compounds of the formula

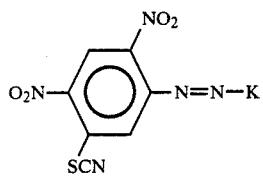

in which K is a coupling component radical.

Preferably K is a disperse dye coupling component radical, more preferably of the aminobenzene series, unsubstituted or substituted or an N-heteocyclic fused ring system, unsubstituted or substituted. Typical groups by which both the aminobenzene series and N-heterocyclic fused ring system coupling radicals may be substituted are those shown attached to the phenyl coupling radical of the examples.

Most preferably K is $K_1$, where $K_1$ is a radical of formula II or of formula III

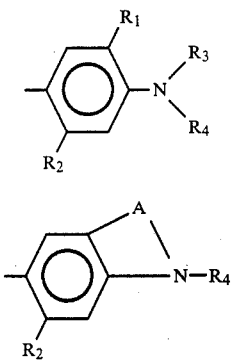

in which
$R_1$ is hydrogen, chloro, bromo, $C_{1-4}$alkyl, $C_{1-4}$alkoxy, benzyloxy or $-O-(CH_2)_n-A_1-C_{1-6}$alkyl,
$R_2$ is hydrogen, chloro, bromo, $C_{1-2}$alkyl, $C_{1-4}$alkoxy, phenyl-($C_{1-3}$alkoxy), acyloxy or acylamino (e.g., $-NHCO-(CH_2)_n-A_1-C_{1-6}$alkyl,
$R_3$ and $R_4$ independently are selected from hydrogen; $C_{1-12}$alkyl), $C_{3-4}$alkenyl; $C_{3-4}$alkynyl; benzyl; $C_{2-6}$alkyl substituted by 1 or 2 substituents independently selected from hydroxy, $C_{1-4}$-alkoxy, acyloxy, chloro, bromo, cyano, phenyl and phenoxy; and $-(CH_2)_n-A_1-C_{1-6}$alkyl,
A is $C_{3-7}$alkylene or a group of the formula $-O-C_{2-4}$alkylene-, with the proviso that the N-atom of the group of formula III is not attached to the oxygen atom,
each n independently is a number from 1-6, inclusive, and each $A_1$ independently is $-O-$, $-O-CO-$, $-O-CO-O-$ or $-CO-O-$.

In this specification, unless indicated to the contrary, those groups capable of being further substituted are not and any alkyl and alkylene groups present are linear or branched. Preferably any alkyl or alkoxy group present is methyl or ethyl or methoxy or ethoxy, respectively.

In this specification, where a symbol appears more than once in a formula its significances are independent of one another.

$R_1$, when $C_{1-4}$alkoxyethoxy, is preferably 2-($C_{1-4}$alkoxy)ethoxy.

Throughout this specification, preferably any hydroxy, alkoxy, acyloxy, cyano, phenoxy or alkoxycarbonyl as a substituent on an alkyl group attached to an oxygen or nitrogen atom is other than in the 1-position and no carbon atom bears more than one such substituent.

Preferred acyl groups referred to in this specification are carbonyl or sulphonyl groups.

Preferably $R_1$ is $R_1'$, where $R_1'$ is hydrogen, $C_{1-2}$alkoxy or $-O-(CH_2)_n-A_1-C_{1-4}$alkyl, more preferably the former two or 2-($C_{1-2}$alkoxy)-ethoxy.

Preferably $R_2$ is $R_2'$, where $R_2'$ is hydrogen, methyl, $C_{1-2}$alkoxy, $C_{1-6}$alkylcarbonylamino, ($C_{1-4}$-alkoxy)carbonylamino, $-NHCOCH_2CH_2Cl$, $-NHCO-CH=CH_2$, $-NHCO-CH=CH-CH_3$ or $-NHCO-(CH_2)_n-A_1-C_{1-6}$alkyl, more preferably hydrogen, methyl, $C_{1-6}$alkylcarbonylamino, ($C_{1-4}$alkoxy)carbonylamino, $-NHCO-CH=CH_2$ or $-NH-CO-CH=CH-CH_3$.

Preferably each of $R_3$ and $R_4$ independently is selected from hydrogen; $C_{1-12}$alkyl; $C_{3-4}$alkenyl; $C_{2-6}$alkyl substituted by one substituent selected from hydroxy, phenoxy, cyano and $C_{1-3}$alkoxy; and $-(CH_2)_n-A_1-C_{1-6}$alkyl.

Preferably n is n', where n' is selected from 2-4, inclusive.

A preferred group of compounds of formula I are those in which
$R_1$ is hydrogen, $R_2$ is $R_3'$, and each of $R_3$ and $R_4$ independently is $C_{1-6}$alkyl or one of $R_3$ and $R_4$ is $C_{1-6}$alkyl and the other is primary or secondary $C_{2-6}$alkyl substituted other than in the 1-position by phenoxy.

Preferred acyloxy groups are selected from $-O-CO-R_5$, $-O-CO-OR_5$, $-O-CO-NR_6R_7$, $-O-SO_2-R_5$ and $-O-SO_2-NR_6R_7$ and preferred acylamino groups are selected from $-NH-CO-R_5$, $-NH-CO-OR_5$, $-NH-CO-NH_2$, $-NH-CO-NHR_5$, $-NH-CO-NR_6R_7$, $-NH-SO_2R_5$, $-NH-SO_2-NR_6R_7$ and $-NH-CO-(CH_2)_n-A,-C,-6$ alkyl, wherein
each $R_5$ independently is selected from linear or branched $C_{1-6}$alkyl, unsubstituted or substituted by one group selected from chloro, bromo, hydroxy, $C_{1-3}$alkoxy and phenoxy; $C_{5-6}$cycloalkyl; $C_{2-4}$alkenyl, unsubstituted or substituted by chloro or bromo; phenyl, unsubstituted or substituted by 1 to 3 substituents independently selected from chloro, bromo, $C_{1-2}$alkyl and $C_{1-2}$alkoxy; and methyl or ethyl substituted by a phenyl group,
each $R_6$ and $R_7$ independently is $C_{1-4}$alkyl, unsubstituted or substituted by one substituent selected from chloro, bromo, hydroxy and $C_{1-3}$alkoxy; or phenyl, unsubstituted or substituted by 1 to 3 substituents independently selected from chloro, bromo, $C_{1-2}$alkyl and $C_{1-2}$alkoxy; or $R_6$ and $R_7$ together with the N-atom to which they are attached form a heterocyclic ring, preferably pyrrolidino, piperidino or morpholino.

Pages 1-3, 12 and 13 of parent application Ser. No. 459,730, filed Jan. 20, 1983, are hereby incorporated by reference as if they were set forth herein in their entirety.

Representative compounds of formula I are those wherein K is $K_{1a}$, where $K_{1a}$ is a group of formula IIa or IIIa

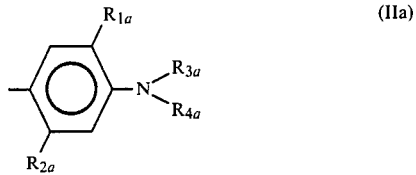

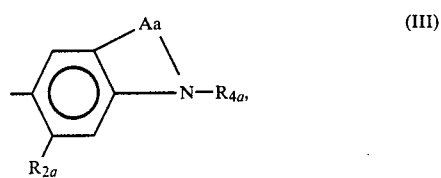

in which
- $R_{1a}$ is hydrogen, chloro, bromo, $C_{1-4}$alkyl, $C_{1-4}$-alkoxy, $C_{1-4}$alkoxyethoxy or benzyloxy,
- $R_{2a}$ is hydrogen, chloro, bromo, $C_{1-2}$alkyl, $C_{1-4}$alkoxy, phenyl-($C_{1-3}$alkoxy), acyloxy or acylamino,
- $R_{3a}$ and $R_{4a}$ independently are selected from hydrogen, $C_{1-12}$alkyl, $C_{3-4}$alkenyl, $C_{3-4}$alkynyl, benzyl and $C_{2-6}$alkyl substituted by 1 or 2 substituents independently selected from hydroxy, $C_{1-4}$alkoxy, acyloxy, chloro, bromo, cyano, phenyl, phenoxy and $C_{1-3}$alkoxycarbonyl, and
- Aa is $C_{3-7}$alkylene or a group of the formula —O—$C_{2-4}$alkylene-, with the proviso that the N-atom of the group of formula IIIa is not attached to the oxygen atom.

Preferably, $R_{1a}$, when $C_{1-4}$alkoxyethoxy, is 2-($C_{1-4}$alkoxy)ethoxy.

Preferably $R_{1a}$ is $R_{1a}'$ where $R_{1a}'$ is hydrogen or $C_{1-2}$alkoxy.

Preferably $R_{2a}$ is $R_{2a}'$ where $R_{2a}'$ is hydrogen, methyl, $C_{1-2}$alkoxy, $C_{1-2}$-alkyl)carbonylamino or ($C_{1-2}$(alkoxy)-carbonylamino.

Preferably each of $R_{3a}$ and $R_{4a}$ independently is selected from hydrogen, $C_{1-8}$alkyl, $C_{3-4}$alkenyl and $C_{2-6}$alkyl substituted by one substituent selected from —OH, ($C_{1-2}$-alkyl)carbonyloxy, $C_{1-2}$-alkoxycarbonyloxy, cyano and ($C_{1-3}$alkoxy)carbonyl, the unsaturation of the $C_{3-4}$alkenyl group and the substituent of the substituted alkyl group preferably being in other than the 1-position.

In formulae IIa and IIIa:

Preferred acyloxy groups are selected from —O—CO—$R_{5a}$, —O—CO—$OR_{5a}$, —O—CO—$NR_6R_7$, —O—$SO_2$—$R_{5a}$ and —O—$SO_2$—$NR_6R_7$ and preferred acylamino groups are selected from —NH—CO—$R_{5a}$, —NH—CO—$OR_{5a}$, —NH—CO—$NH_2$, —NH—CO—$NHR_{5a}$, —NH—CO—$NR_6R_7$, —NH—$SO_2R_{5a}$ and —NH—$SO_2$—$NR_6R_7$, in which each $R_{5a}$ independently is selected from linear or branched $C_{1-6}$alkyl, unsubstituted or substituted by one group selected from chloro, bromo, —OH, $C_{1-3}$alkoxy and phenoxy; $C_{5-6}$cycloalkyl; $C_{3-4}$-alkenyl, unsubstituted or substituted by chloro or bromo; phenyl, unsubstituted or substituted by 1 to 3 substituents independently selected from chloro, bromo, $C_{1-2}$alkyl and $C_{1-2}$alkoxy; and methyl or ethyl substituted by a phenyl group, and $R_6$ and $R_7$ are as defined above.

When A or Aa is $C_{3-7}$alkylene, there are preferably at least three carbon atoms between the nitrogen atom and the benzene ring and when A or Aa is —O—$C_{2-4}$alkylene-, there are preferably at least two carbon atoms between the oxygen and nitrogen atoms.

Preferably, any substituted alkyl group as a significance of $R_3$, $R_{3a}$, $R_4$ and $R_{4a}$ is monosubstituted.

Preferably, the unsaturation of any $C_{3-4}$alkenyl or alkynyl group as a significance of $R_3$, $R_{3a}$, $R_4$ or $R_{4a}$ is in other than the 1-position.

Preferred compounds of formula I are of formulae Ia, Ib, Ic and Id:

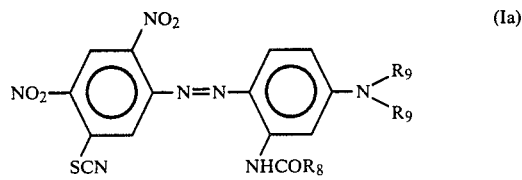

where
- $R_8$ is —CH=CH$_2$, —CH=CH—CH$_3$, $C_{1-6}$alkyl, —CH$_2$Cl, —CH$_2$CH$_2$Cl or —CH$_2$OC$_6$H$_5$, and
- $R_9$ is $C_{1-6}$alkyl or —(CH$_2$)$_n$—A$_1$—$C_{1-6}$alkyl,

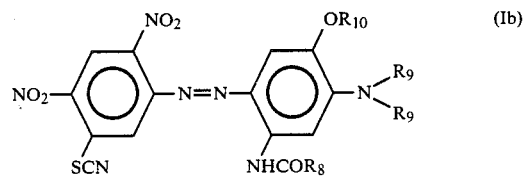

where
- $R_{10}$ is —CH$_3$, —C$_2$H$_5$, or —(CH$_2$)$_n$—A$_1$—$C_{1-6}$alkyl (e.g., —C$_2$H$_4$—O—CH$_3$ and —C$_2$H$_4$—O—C$_2$H$_5$),

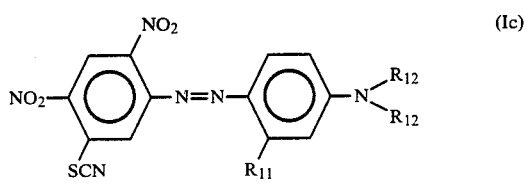

where
- $R_{11}$ is hydrogen, —CH$_3$, —C$_2$H$_5$ or —NHCOR$_8$, each
- $R_{12}$ independently is $C_{1-4}$alkyl or —(CH$_2$)$_{2-6}$—O—C$_6$H$_5$, with
- the proviso that at most one $R_{12}$ is —(CH$_2$)$_{2-6}$—O—C$_6$H$_5$,

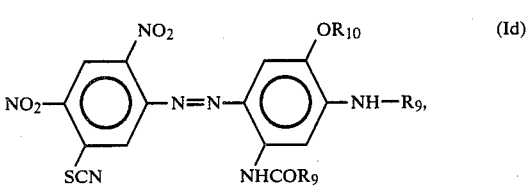

where each of the symbols not defined in connection with a formula is as defined above. In formulae Ia–Id, n is preferably n'.

The compounds of formula I may be prepared by coupling a diazotised amine of formula IV

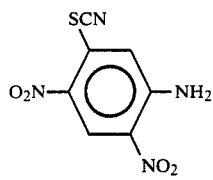

with a compound of formula V

H—K            (V)

where
K is defined above.

Alternatively, the compounds of formula I may be prepared by reacting a compound of formula VI

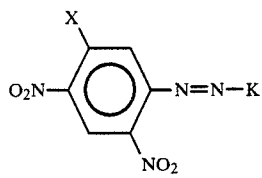

where
X is halogen, preferably chloro or bromo, and K is defined above, with a salt of thiocyanic acid.

The compound of formula IV is known and the compounds of formulae V and VI may be made from known compounds according to known procedures. Diazotisation and coupling can be carried out according to known methods.

The reaction of a compound of formula VI with a salt of thiocyanic acid (preferably an alkali metal or ammonium salt) is usually carried out in the presence of an aprotic solvent, for example dimethylformamide, N-methylpyrrolidone, sulpholane or dimethylsulphoxide, and the reaction takes place easily. Other solvents may be used, for example an alcohol or a mixture of water and organic solvent. Phase transfer conditions may be used.

Dyeing preparations of the compounds of formula I may be formulated by known methods, for example by grinding in the presence of a dispersing agent or a filling material. The preparation (which may be vacuum dried or atomised dried) can be used for dyeing, padding or printing with the addition of water in a short or long dyebath.

The dyestuffs exhaust very well from aqueous suspension on textile material of semi-synthetic or fully synthetic hydrophobic high molecular weight material. The dyestuffs exhaust particularly well on textile material formed from linear aromatic polyester or cellulose 2½-acetate, cellulose triacetate or synthetic polyamides. The resulting dyeings show overall good fastnesses, in particular good light fastness, wet fastness (for example washing and sweat fastness) and sublimation fastness. The dyestuffs also produce a large colouring strength and excellent brilliance.

The invention will now be illustrated by the following Examples in which all parts and percentages are by weight and all temperatures are in °C.

EXAMPLE 1

10 Parts of 2,4-dinitro-5-thiocyanoaniline in 120 parts of an 85% orthophosphoric acid solution are reacted at −10° with 13.5 parts of a 40% solution of nitrosylsulphuric acid in concentrated sulphuric acid. The mixture is stirred for 6 hours at this temperature and then a mixture of 6.3 parts of N,N-diethyl-m-toluidine, 70 parts of hydrochloric acid and 70 parts of ice is slowly added to the resulting suspension. After addition the reaction mass is warmed to 10° and stirred for 16 hours. The dyestuff of formula X

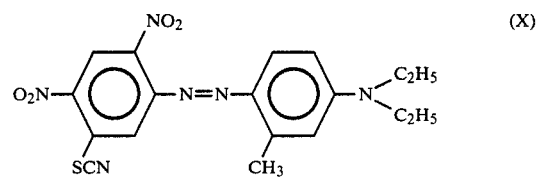

results and is filtered, washed in water and vacuum dried. The resulting dyestuff is of a blue colour.

EXAMPLE 2

The dyestuff of formula XI

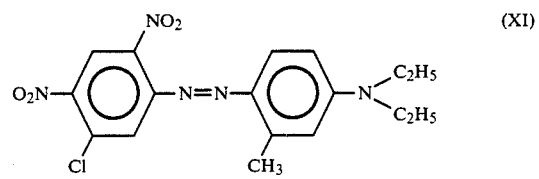

is prepared by diazotising 5-chloro-2,4-dinitroaniline and coupling with N,N-diethyl-m-toluidine in an analogous manner to that of Example 1. 10 Parts of the above dyestuff XI are stirred with 2.5 parts of potassium thiocyanate in 100 parts of dimethylformamide for 16 hours at 80° C. The reaction mixture is cooled to room temperature and 1500 parts of water are added. The product that results is the dyestuff of formula X defined in Example 1. The product is filtered, washed with water and vacuum dried and has a blue shade.

EXAMPLES 3 TO 90

Compounds of formula XII

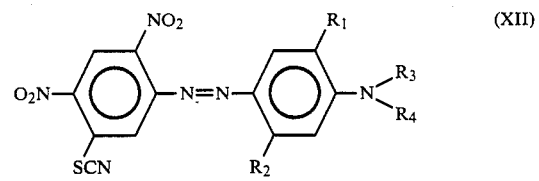

in which $R_1$ to $R_4$ are defined in Table I below, can be prepared by a method analogous to Example 1 or Example 2. The shades of the dyes produced is given in Table 1. PES is polyester.

TABLE 1

| EX. No. | R₁ | R₂ | R₃ | R₄ | Shade on PES |
|---|---|---|---|---|---|
| 3 | —H | —H | —$C_2H_5$ | —$C_2H_5$ | blue |
| 4 | —$CH_3$ | —H | " | " | " |
| 5 | —$C_2H_5$ | —H | " | " | " |
| 6 | —$OCH_3$ | —$NHCOCH_3$ | —$CH_2CH_2OCOCH_3$ | —$CH_2CH_2OCOCH_3$ | green |
| 7 | —$OC_2H_5$ | " | " | " | " |
| 8 | —$OCH_2CH_2OC_2H_5$ | " | " | " | " |
| 9 | —$OCH_2C_6H_5$ | " | " | " | " |
| 10 | —H | —$C_2H_5$ | —$C_2H_5$ | —$C_2H_5$ | " |
| 11 | —H | —Cl | —$CH_3$ | —$CH_3$ | violet |
| 12 | —H | —Br | " | " | " |
| 13 | —H | —$OCH_3$ | —$C_2H_5$ | —$C_2H_5$ | blue |
| 14 | —H | —$O(CH_2)_3CH_3$ | " | " | " |
| 15 | —H | —O—$CH_2C_6H_5$ | " | " | " |
| 16 | —H | —$O(CH_2)_3C_6H_5$ | " | " | " |
| 17 | —H | —$OCOCH_3$ | " | " | " |
| 18 | —H | —$OCOC_6H_5$ | " | " | " |
| 19 | —H | —$OCOOC_2H_5$ | " | " | " |
| 20 | —H | —$OCON(CH_3)_2$ | " | " | " |
| 21 | —H | —$OSO_2CH_3$ | " | " | " |
| 22 | —H | —$OSO_2(CH_2)_3CH_3$ | " | " | " |
| 23 | —H | —$OSO_2$—C₆H₄—$CH_3$ | " | " | " |
| 24 | —H | —$OSO_2$—N(piperidyl) | " | " | " |
| 25 | —H | —$NHCOCH_3$ | " | " | " |
| 26 | —H | —$NHCOC_2H_5$ | " | " | " |
| 27 | —H | —$NHCO(CH_2)_5CH_3$ | " | " | " |
| 28 | —H | —$NHCOCH_2Cl$ | " | " | " |
| 29 | —H | —$NHCOCH_2Br$ | " | " | " |
| 30 | —H | —$NHCOCH_2CH_2Cl$ | " | " | " |
| 31 | —H | —$NHCO(CH_2)_3OH$ | " | " | " |
| 32 | —H | —$NHCOCH_2$—CH=$CH_2$ | " | " | " |
| 33 | —H | —NHCO—C₆H₁₁ | " | " | " |
| 34 | —H | —$NHCOCH_2OC_6H_5$ | " | " | " |
| 35 | —H | —$NHCOOCH_3$ | " | " | " |
| 36 | —H | —$NHCOOC_2H_5$ | " | " | " |
| 37 | —H | —$NHCOOCH_2CH(CH_3)_2$ | " | " | " |
| 38 | —H | —$NHCOOC_6H_5$ | " | " | " |
| 39 | —H | —$NHCOOCH_2C_6H_5$ | " | " | " |
| 40 | —H | —$NHCOOCH_2$—CH=$CH_2$ | " | " | " |
| 41 | —H | —$NHCOOCH_2CH_2OC_2H_5$ | " | " | " |
| 42 | —H | —$NHCONH_2$ | " | " | " |
| 43 | —H | —$NHCONHCH_3$ | " | " | " |
| 44 | —H | —$NHCONH(CH_2)_3CH_3$ | " | " | " |
| 45 | —H | —$NHCONHC_6H_5$ | " | " | " |
| 46 | —H | —$NHCON(C_2H_5)_2$ | " | " | " |
| 47 | —H | —$CH_3$ | " | —H | violet |
| 48 | —H | " | " | —$CH_3$ | blue |
| 49 | —H | " | " | —$(CH_2)_3CH_3$ | " |
| 50 | —H | " | " | —$CH_2CH_2CH(CH_3)_2$ | " |
| 51 | —H | " | " | —$(CH_2)_5CH_3$ | " |
| 52 | —H | " | " | —$(CH_2)_9CH_3$ | " |
| 53 | —H | " | " | —$(CH_2)_{11}CH_3$ | " |
| 54 | —H | " | " | —$CH_2C_6H_5$ | " |
| 55 | —H | " | " | —$CH_2CH_2C_6H_5$ | blue |
| 56 | —H | " | " | —$(CH_2)_3C_6H_5$ | " |
| 57 | —H | " | " | —$CH_2CH_2Cl$ | violet |
| 58 | —H | " | " | —$CH_2CH_2CN$ | " |
| 59 | —H | " | " | —$CH_2CH_2OH$ | " |
| 60 | —H | " | " | —$CH_2CH_2OCOCH_3$ | " |
| 61 | —H | " | " | —$CH_2CH_2OCOC_6H_5$ | " |
| 62 | —H | " | " | —$CH_2CH_2OCONHC_6H_5$ | " |
| 63 | —H | " | " | —$CH_2CH_2OC_2H_5$ | " |
| 64 | —H | " | " | —$CH_2CH_2OC_6H_5$ | " |
| 65 | —H | " | " | —$(CH_2)_3OC_6H_5$ | " |

TABLE 1-continued

| EX. No. | $R_1$ | $R_2$ | $R_3$ | $R_4$ | Shade on PES |
|---|---|---|---|---|---|
| 66 | —H | " | " | —(CH$_2$)$_4$OC$_6$H$_5$ | " |
| 67 | —H | " | " | —(CH$_2$)$_5$OC$_6$H$_5$ | " |
| 68 | —H | " | " | —(CH$_2$)$_6$OC$_6$H$_5$ | " |
| 69 | —H | " | " | —CH$_2$—CH=CH$_2$ | " |
| 70 | —H | " | " | —CH$_2$—CH=CH—CH$_3$ | " |
| 71 | —H | " | " | —CH$_2$—C≡CH | " |
| 72 | —H | " | " | —CH$_2$CH$_2$—COOC$_2$H$_5$ | " |
| 73 | —H | " | " | —CH$_2$CH(OH)CH$_2$OC$_6$H$_5$ | " |
| 74 | —OCH$_3$ | —NHCOCH$_3$ | " | —C$_2$H$_5$ | green |
| 75 | —OC$_2$H$_5$ | " | " | " | " |
| 76 | —H | —NHCOC$_6$H$_5$ | " | " | blue |
| 77 | —H | 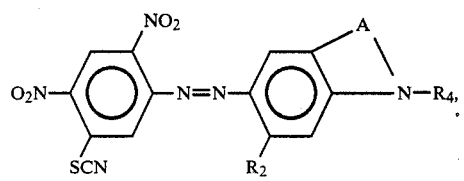 —NHCO—⟨C$_6$H$_4$⟩—CH$_3$ | " | " | " |
| 78 | —H | —NHCO(CH$_2$)$_2$CH$_3$ | " | " | " |
| 79 | —H | —NHCOCH(CH$_3$)$_2$ | " | " | " |
| 80 | —H | —NHCOCH$_2$CH(CH$_3$)$_2$ | " | " | " |
| 81 | —H | —NHCO(CH$_2$)$_4$CH$_3$ | " | " | " |
| 82 | —H | —NHCOC(CH$_3$)$_3$ | " | " | " |
| 83 | —H | —CH$_3$ | —(CH$_2$)$_3$CH$_3$ | —(CH$_2$)$_3$CH$_3$ | " |
| 84 | —H | " | —CH$_2$CH$_2$CH(CH$_3$)$_2$ | —CH$_2$CH$_2$CH(CH$_3$)$_2$ | " |
| 85 | —H | —CH$_3$ | —(CH$_2$)$_5$CH$_3$ | —(CH$_2$)$_5$CH$_3$ | blue |
| 86 | —H | —H | —C$_2$H$_5$ | —CH$_2$CH$_2$—O—C$_6$H$_5$ | violet |
| 87 | —H | —H | —CH$_2$CH$_2$CN | —CH$_2$CH$_2$OCOCH$_3$ | red |
| 88 | —H | —H | —CH$_2$CH$_2$OCOCH$_3$ | " | violet |
| 89 | —CH$_3$ | —CH$_3$ | —H | —(CH$_2$)$_5$CH$_3$ | " |
| 90 | —OCH$_3$ | —CH$_3$ | —CH$_3$ | —CH$_2$CH(OH)—CH$_2$—O—C$_6$H$_5$ | greenish-blue |

EXAMPLES 91 TO 96

Compounds of formula XIII

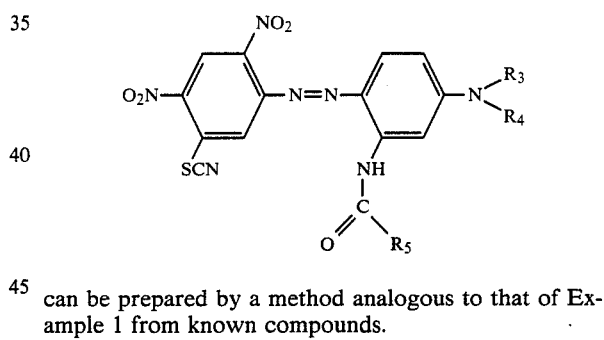

in which $R_2$ to $R_4$ and A are defined in Table 2 below, can be prepared by a method analogous to that of Example 1 or 2. The shade of the dye produced is given in Table 2.

TABLE 2

| EX. No. | $R_2$ | $R_4$ | A | Shade on PES |
|---|---|---|---|---|
| 91 | —H | —(CH$_2$)$_5$CH$_3$ | —(CH$_2$)$_3$— | blue |
| 92 | —H | " | —CH(CH$_3$)CH$_2$C(CH$_3$)$_2$— | " |
| 93 | —H | —H | " | " |
| 94 | —CH$_3$ | —H | " | " |
| 95 | —CH$_3$ | —(CH$_2$)$_5$CH$_3$ | " | " |
| 96 | —H | " | —O—CH$_2$—CH(CH$_3$)— | " |

EXAMPLES 97 TO 105

Compounds of the formula can be prepared by a method analogous to that of Example 1 from known compounds.

| Example No. | $R_3$ | $R_4$ | $R_5$ |
|---|---|---|---|
| 97 | —C$_2$H$_5$ | —C$_2$H$_5$ | —CH=CH$_2$ |
| 98 | —(CH$_2$)$_3$CH$_3$ | " | " |
| 99 | —(CH$_2$)$_2$CH(CH$_3$)$_2$ | " | " |
| 100 | —(CH$_2$)$_2$CH$_3$ | —(CH$_2$)$_2$CH$_3$ | " |
| 101 | —(CH$_2$)$_3$CH$_3$ | " | " |
| 102 | —(CH$_2$)$_2$CH(CH$_3$)$_2$ | " | " |
| 103 | —(CH$_2$)$_5$CH$_3$ | " | " |
| 104 | —(CH$_2$)$_3$CH$_3$ | —(CH$_2$)$_3$CH$_3$ | " |
| 105 | —C$_2$H$_5$ | —C$_2$H$_5$ | —CH=CH—CH$_3$ |

The compounds of Examples 97 to 105 produce blue dyeings on PES.

DYEING EXAMPLE

7 Parts of the dyestuff of Example 1 are ground with 13 parts of sodium ligninsulphonate 25 parts of water and 100 parts of siliquarzite pearls until the average dyestuff particle size is less than 1μ. The suspension so formed is filtered from the siliquarzite pearls and is dried under mild conditions and atomised. 1 Part of the dyestuff preparation so formed is warmed to 60° in 4000 parts of water buffered at pH 5 with monosodium phosphate and disodium phosphate to form a dyebath. 100 Parts of a polyester web is dyed with the dyebath for 1 hour at 130° 1 C. under pressure. After cooling, rinsing, soaping and a further rinsing, the web is dried. A dyeing is produced having a level blue colour with high fastness properties.

Instead of using the dyestuff of Example 1, any one of the dyestuffs of Examples 2 to 105 can be used in the dyeing method above.

What is claimed is:

1. A compound of the formula

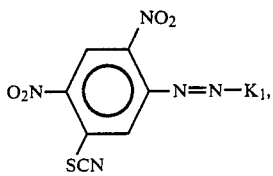

wherein
K$_1$ is

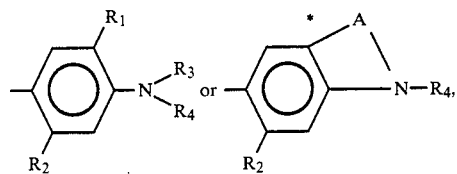

wherein
A is C$_{3-7}$alkylene or —O—C$_{2-4}$alkylene, with the proviso that the oxygen atom of the —O—C$_{2-4}$alkylene-radical is attached to the asterisked atom,
R$_1$ is hydrogen, chloro, bromo, C$_{1-4}$-alkyl, C$_{1-4}$alkoxy, benzyloxy or —O—(CH$_2$)$_n$—A$_1$—C$_{1-6}$alkyl,
wherein
A$_1$ is —O—, —O—CO—, —O—CO—O— or —CO—O—, and
n is 1, 2, 3, 4, 5 or 6
R$_2$ is hydrogen, chloro, bromo, C$_{1-2}$alkyl, C$_{1-4}$alkoxy, phenyl(C$_{1-3}$alkoxy), acyloxy or acylamino, and each of
R$_3$ and R$_4$ is independently hydrogen; C$_{1-12}$alkyl; C$_{3-4}$alkenyl; C$_{3-4}$alkynyl; benzyl; C$_{2-6}$alkyl substituted by 1 or 2 substituents each of which is independently hydroxy, C$_{1-4}$alkoxy, acyloxy, chloro, bromo, cyano, phenyl or phenoxy; or —(CH$_2$)$_n$—A$_1$—C$_{1-6}$alkyl,
wherein
A$_1$ and n are as defined above, with the proviso that any —(CH$_2$)$_n$—A$_1$—C$_{1-6}$alkyl as R$_3$ or R$_4$ is other than —(CH$_2$)$_m$—O—C$_{1-4}$-alkyl, —(CH$_2$)$_m$—O—CO—C$_{1-6}$alkyl and —(CH$_2$)$_m$—O—CO—O—C$_{1-6}$alkyl,
wherein
m is 2, 3, 4, 5 or 6.

2. A compound of the formula

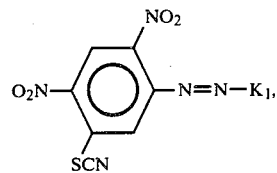

wherein
K$_1$ is

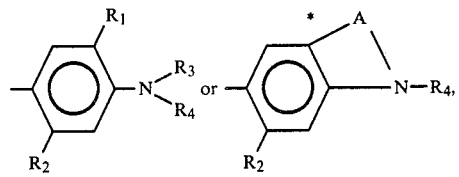

wherein
A is C$_{3-7}$alkylene or —O—C$_{2-4}$alkylene, with the proviso that the oxygen atom of the —O—C$_{2-4}$alkylene-radical is attached to the asterisked atom,
R$_1$ is hydrogen, chloro, bromo, C$_{1-4}$alkyl, C$_{1-4}$alkoxy, benzyloxy or —O—(CH$_2$)$_n$—A$_1$—C$_{1-6}$alkyl,
wherein
A$_1$ is —O—, —O—CO—, —O—CO—O— or —CO—O—, and
n is 1, 2, 3, 4, 5 or 6,
R$_2$ is hydrogen, chloro, bromo, C$_{1-2}$alkyl, C$_{1-4}$alkoxy, phenyl(C$_{1-3}$alkoxy), acyloxy or acylamino, and each of
R$_3$ and R$_4$ is independently hydrogen; C$_{1-12}$alkyl; C$_{3-4}$alkenyl; C$_{3-4}$alkynyl; benzyl; C$_{2-6}$alkyl substituted by 1 or 2 substituents each of which is independently hydroxy, C$_{1-4}$alkoxy, acyloxy, chloro, bromo, cyano, phenyl or phenoxy; or —(CH$_2$)$_n$—A$_1$—C$_{1-6}$alkyl,
wherein
A$_1$ and n are as defined above, with the proviso that any —(CH$_2$)$_n$—A$_1$—C$_{1-6}$alkyl as R$_3$ or R$_4$ is other than —(CH$_2$)$_m$—O—C$_{1-4}$alkyl, —(CH$_2$)$_m$—O—CO—C$_{1-6}$alkyl and —(CH$_2$)$_m$—O—CO—O—C$_{1-6}$alkyl,
wherein
m is 2, 3, 4, 5 or 6,
wherein each acylamino is independently —NH—CO—R$_5$, —NH—CO—OR$_5$, —NH—CO—NH$_2$, —NH—CO—NHR$_5$, —NH—CO—NR$_6$R$_7$, —NH—SO$_2$R$_5$, —NH—SO$_2$—NR$_6$R$_7$ or —NH—CO—(CH$_2$)$_n$—A$_1$—C$_{1-6}$alkyl,
wherein
A$_1$ is —O—, —O—CO—, —O—CO—O— or —CO—O—, with the proviso that when A$_1$ is —O—, the C$_{1-6}$alkyl group attached thereto is a C$_{4-6}$alkyl group,
R$_5$ is C$_{1-6}$alkyl; C$_{1-6}$alkyl monosubstituted by chloro, bromo, hydroxy, C$_{1-3}$alkoxy or phenoxy; C$_{5-6}$cycloalkyl; C$_{2-4}$alkenyl; C$_{2-4}$alkenyl substituted by chloro or bromo; phenyl; phenyl substituted by 1 to 3 substituents each of which is independently chloro, bromo, C$_{1-2}$alkyl or C$_{1-2}$alkoxy; or C$_{1-2}$alkyl substituted by phenyl, each of
R$_6$ and R$_7$ is independently C$_{1-4}$alkyl; C$_{1-4}$alkyl monosubstituted by chloro, bromo, hydroxy or C$_{1-3}$alkoxy; phenyl or phenyl substituted by 1 to 3 substituents each of which is independently chloro, bromo, $C_{1-2}$alkyl or $C_{1-2}$alkoxy or $R_6$ and $R_7$ taken together and with the nitrogen atom to which they are attached are pyrrolidino, piperidino or morpholino, and n is 1, 2, 3, 4, 5 or 6, and each acyloxy is independently —O—CO—$R_5$, —O—CO—O$R_5$, —O—CO—N$R_6R_7$, —O—SO$_2$—$R_5$ or —O—SO$_2$—N$R_6R_7$, wherein $R_5$, $R_6$ and $R_7$ are as defined above.

3. A compound according to claim 2 wherein when

A is $C_{3-7}$alkylene there are at least three carbon atoms between the asterisked atom and the nitrogen atom to which A is attached, and when A is —O—$C_{2-4}$alkylene- there are at least two carbon atoms between the oxygen atom of A and the nitrogen to which A is attached, any hydroxy, alkoxy, acyloxy, cyano, phenoxy or alkoxycarbonyl as a substituent on an alkyl group attached to an oxygen or nitrogen atom is in other than the 1-position of the alkyl group, and no carbon atom of a substituted alkyl group has more than one substituent selected from hydroxy, alkoxy, acyloxy, cyano, phenoxy and alkoxycarbonyl, the double bond of any $C_{3-4}$alkenyl group as $R_3$ or $R_4$ and the triple bond of any $C_{3-4}$alkynyl group as $R_3$ or $R_4$ are in other than the 1-position, and each n is independently 2, 3 or 4.

4. A compound according to claim 2 wherein $R_1$ is hydrogen, $C_{1-2}$alkoxy or 2-($C_{1-2}$alkoxy)ethoxy, $R_2$ is hydrogen, methyl, $C_{1-2}$alkoxy, ($C_{1-6}$alkyl)carbonylamino, ($C_{1-4}$alkoxy)carbonylamino, 3-chloropropionamido, vinylcarbonylamino, prop-1-en-1-ylcarbonylamino or —NH—CO—(CH$_2$)$_n$—A$_1$—C$_{1-6}$alkyl, wherein A$_1$ is —O—, —O—CO—, —O—CO—O— or —CO—O—, and n is 1, 2, 3, 4, 5 or 6, and each of $R_3$ and $R_4$ is independently hydrogen, $C_{1-12}$alkyl, $C_{3-4}$alkenyl, $C_{2-6}$alkyl monosubstituted by hydroxy, phenoxy, cyano or $C_{1-3}$alkoxy; or —(CH$_2$)$_{n'}$—A$_1$—C$_{1-6}$alkyl, wherein A$_1$ is —O—, —O—CO—, —O—CO—O— or —CO—O—, and n' is 2, 3 or 4, with the proviso that any —(CH$_2$)$_{n'}$—A$_1$—C$_{1-6}$alkyl as $R_3$ or $R_4$ is other than —(CH$_2$)$_{n'}$—O—C$_{1-3}$alkyl.

5. A compound according to claim 4 wherein $R_1$ is hydrogen, $R_3$ is $C_{1-6}$alkyl or primary or secondary $C_{2-6}$alkyl substituted by phenoxy in other than the 1-position, and $R_4$ is $C_{1-6}$alkyl.

6. A compound according to claim 2 having the formula

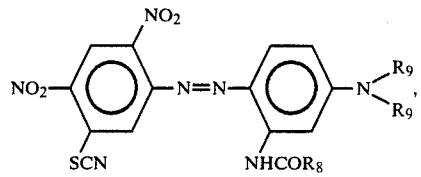

wherein $R_8$ is vinyl, prop-1-en-1-yl, $C_{1-6}$alkyl, chloromethyl, 2-chloroethyl or phenoxymethyl, and each $R_9$ is independently $C_{1-6}$alkyl or —(CH$_2$)$_n$—A$_1$—C$_{1-6}$alkyl, wherein A$_1$ is —O—, —O—CO—, —O—CO—O— or —CO—O—, and n is 1, 2, 3, 4, 5 or 6.

7. A compound according to claim 6 wherein n is 2, 3 or 4.

8. A compound according to claim 7 wherein the two $R_9$'s are identical.

9. The compound according to claim 8 wherein $R_8$ is vinyl, and each $R_9$ is ethyl.

10. A compound according to claim 2 having the formula

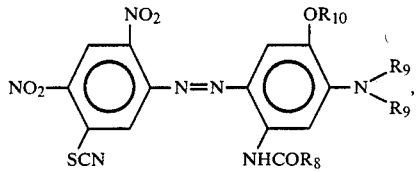

wherein $R_8$ is vinyl, prop-1-en-1-yl, $C_{1-6}$alkyl, chloromethyl, 2-chloroethyl or phenoxymethyl, each $R_9$ is independently $C_{1-6}$alkyl or —(CH$_2$)$_n$—A$_1$—C$_{1-6}$alkyl, wherein A$_1$ is —O—, —O—CO—, —O—CO—O— or —CO—O—, and n is 1, 2, 3, 4, 5 or 6, and $R_{10}$ is methyl, ethyl or —(CH$_2$)$_n$—A$_1$—C$_{1-6}$alkyl, wherein A$_1$ and n are as defined above.

11. A compound according to claim 10 wherein n is 2, 3 or 4.

12. A compound according to claim 11 wherein the two $R_9$'s are identical.

13. A compound according to claim 2 having the formula

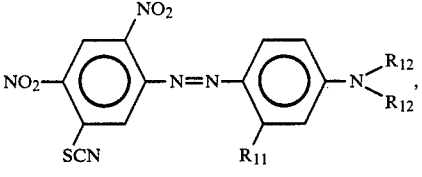

wherein $R_{11}$ is hydrogen, methyl, ethyl or —NH—CO—$R_8$, wherein $R_8$ is vinyl, prop-1-en-1-yl, $C_{1-6}$alkyl, chloromethyl, 2-chloroethyl or phenoxymethyl, and each $R_{12}$ is independently $C_{1-4}$alkyl or —(CH$_2$)$_m$—O—C$_6$H$_5$, wherein m is 2, 3, 4, 5 or 6, with the proviso that not more than one $R_{12}$ is —(CH$_2$)$_m$—O—C$_6$H$_5$.

14. The compound according to claim 13 having the formula

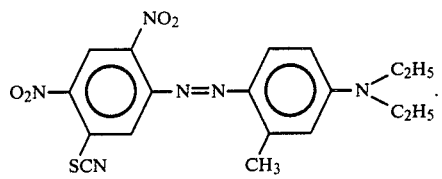

15. A compound according to claim 2 having the formula

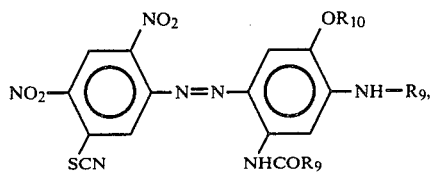

wherein each $R_9$ is independently $C_{1-6}$alkyl or
—(CH$_2$)$_n$—A$_1$—C$_{1-6}$alkyl,
wherein
A$_1$ is —O—, —O—CO—, —O—CO—O— or
—CO—O—, and
n is 1, 2, 3, 4, 5 or 6, and
$R_{10}$ is methyl, ethyl or —(CH$_2$)$_n$—A$_1$—C$_{1-6}$alkyl,
wherein
A$_1$ and n are as defined above.

16. A compound according to claim 15 wherein n is 2, 3 or 4.

17. A compound according to claim 16 wherein the two $R_9$'s are identical.

18. A compound according to claim 15 wherein the two $R_9$'s are identical.

* * * * *